United States Patent
Freund et al.

(10) Patent No.: US 12,231,500 B1
(45) Date of Patent: Feb. 18, 2025

(54) EXPLOITING STRUCTURE IN ENVIRONMENT SENSOR DYNAMICS FOR REAL-TIME MAXIMIZATION OF INFORMATION GAIN

(71) Applicant: Dell Products L.P., Round Rock, TX (US)

(72) Inventors: Werner Spolidoro Freund, Rio de Janeiro (BR); Paulo Abelha Ferreira, Rio de Janeiro (BR); Julia Drummond Noce, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/493,514

(22) Filed: Oct. 24, 2023

(51) Int. Cl.
- *H04L 67/12* (2022.01)
- *H04L 41/12* (2022.01)
- *H04L 67/10* (2022.01)

(52) U.S. Cl.
CPC .............. *H04L 67/12* (2013.01); *H04L 41/12* (2013.01); *H04L 67/10* (2013.01)

(58) Field of Classification Search
CPC ... H04L 67/1097; H04L 67/306; H04L 67/52; H04L 67/34; H04L 67/01; H04L 67/02; H04L 41/12; H04L 67/12; H04L 67/10; H04W 4/80
See application file for complete search history.

(56) References Cited

U.S. PATENT DOCUMENTS

| | | | | |
|---|---|---|---|---|
| 8,261,033 B1 * | 9/2012 | Slik | ........................ | G06F 3/067 711/111 |
| 10,142,353 B2 * | 11/2018 | Yadav | ................. | H04L 63/0227 |
| 10,429,197 B1 * | 10/2019 | Carrino | .............. | G01C 21/3461 |
| 10,964,097 B2 * | 3/2021 | Teply | .................... | G06T 15/205 |
| 11,157,527 B2 | 10/2021 | Wang et al. | | |
| 11,227,401 B1 | 1/2022 | Mahieu et al. | | |

(Continued)

FOREIGN PATENT DOCUMENTS

| CN | 110537078 A | 12/2019 |
|---|---|---|
| CN | 116368355 A | 6/2023 |

OTHER PUBLICATIONS

Dahmen et al., "Verification and validation of Digital twins and virtual testbed," International Journal of Advances in Applied sciences, vol. 11, n° 1, 2022.

(Continued)

*Primary Examiner* — Ninos Donabed
(74) *Attorney, Agent, or Firm* — Workman Nydegger

(57) ABSTRACT

One example method includes performing, in a global environment that includes a central node and edge nodes that are able to communicate with each other, by the central node, operations including: sampling optimal information from the edge nodes concerning a state of the global environment, the edge nodes being grouped into a plurality of cluster structures based on the optimal information, updating a global map of the global environment, based on the optimal information, updating an information retrieval cost, using the state of the global environment to orchestrate placement and execution of one or more tasks and actions in the global environment, using the updated global map, information retrieval cost, tasks and actions to update an attention mechanism operable to control retrieval of next optimal information, and selecting next optimal information for retrieval.

16 Claims, 8 Drawing Sheets

(56) References Cited

U.S. PATENT DOCUMENTS

| | | | |
|---|---|---|---|
| 11,312,379 | B2 | 4/2022 | Taylor et al. |
| 11,314,254 | B2 | 4/2022 | Macias et al. |
| 11,402,830 | B2 | 8/2022 | Sullivan et al. |
| 11,436,504 | B1 | 9/2022 | Lukarski et al. |
| 11,595,269 | B1 | 2/2023 | Ghosh et al. |
| 11,792,262 | B1* | 10/2023 | Chung ................ H04L 67/1097 709/217 |
| 11,819,734 | B2* | 11/2023 | Lee .................... A63B 24/0021 |
| 11,985,074 | B1 | 5/2024 | Freund et al. |
| 2002/0152318 | A1* | 10/2002 | Menon ............ H04N 21/44204 709/231 |
| 2010/0045701 | A1* | 2/2010 | Scott ........................ G06T 7/80 348/135 |
| 2012/0090667 | A1* | 4/2012 | Cap ........................ F24S 20/70 136/251 |
| 2013/0307720 | A1* | 11/2013 | Lilburn ................... G01S 7/046 342/25 F |
| 2014/0278517 | A1* | 9/2014 | Patel ................. G06Q 10/0637 705/2 |
| 2014/0309841 | A1 | 10/2014 | Hara et al. |
| 2016/0071278 | A1 | 3/2016 | Leonard et al. |
| 2016/0292908 | A1 | 10/2016 | Obert |
| 2016/0359872 | A1* | 12/2016 | Yadav ..................... H04L 63/02 |
| 2017/0248963 | A1 | 8/2017 | Levinson et al. |
| 2017/0317920 | A1 | 11/2017 | Rocquelay et al. |
| 2018/0137390 | A1* | 5/2018 | Brundage ............... G06F 18/28 |
| 2018/0173239 | A1 | 6/2018 | Yoon et al. |
| 2019/0043246 | A1* | 2/2019 | Teply ........................ G06T 7/97 |
| 2019/0163191 | A1 | 5/2019 | Sorin et al. |
| 2019/0285396 | A1* | 9/2019 | Yao ........................ G01B 5/202 |
| 2020/0026292 | A1 | 1/2020 | Douillard et al. |
| 2020/0036595 | A1 | 1/2020 | Wallerstein et al. |
| 2021/0021485 | A1* | 1/2021 | Guim Bernat ........ H04L 43/087 |
| 2021/0140773 | A1 | 5/2021 | Ondruska et al. |
| 2021/0144517 | A1* | 5/2021 | Guim Bernat ...... H04L 41/0869 |
| 2021/0150771 | A1 | 5/2021 | Huang et al. |
| 2021/0169417 | A1* | 6/2021 | Burton ................. A61B 5/4857 |
| 2021/0302260 | A1* | 9/2021 | Baggs ..................... H04W 4/80 |
| 2022/0082408 | A1 | 3/2022 | Montemerlo et al. |
| 2022/0129426 | A1* | 4/2022 | Sohail ................... G06F 16/215 |
| 2022/0131934 | A1* | 4/2022 | Oku ..................... H04L 67/1014 |
| 2022/0138966 | A1* | 5/2022 | Sung ........................ G06T 7/246 382/103 |
| 2022/0147407 | A1* | 5/2022 | Asgar ................. G06F 11/3089 |
| 2022/0187841 | A1 | 6/2022 | Ebrahimi et al. |
| 2022/0200917 | A1 | 6/2022 | Mortensen et al. |
| 2022/0203165 | A1* | 6/2022 | Lee ........................... G06N 3/08 |
| 2022/0204019 | A1 | 6/2022 | Lauterbach et al. |
| 2022/0245111 | A1 | 8/2022 | Harrison et al. |
| 2022/0329650 | A1* | 10/2022 | Zhang ................. H04L 67/1001 |
| 2022/0413989 | A1 | 12/2022 | Karri et al. |
| 2023/0005217 | A1 | 1/2023 | Chen et al. |
| 2023/0071442 | A1* | 3/2023 | Tripathy ................. G06F 18/29 |
| 2023/0106877 | A1* | 4/2023 | Simeonov ............... H04L 67/34 717/170 |
| 2023/0117081 | A1* | 4/2023 | Hunter ..................... G06F 8/60 709/226 |
| 2023/0156074 | A1* | 5/2023 | Kim .................... H04L 12/4633 709/201 |
| 2023/0161041 | A1* | 5/2023 | Schindler ............... G01S 7/4815 356/615 |
| 2023/0231903 | A1* | 7/2023 | Zeng ................... H04L 67/1008 709/223 |
| 2023/0237064 | A1* | 7/2023 | Bao ........................ G06F 16/258 707/756 |
| 2023/0275834 | A1* | 8/2023 | Huang ................... H04L 45/76 370/392 |
| 2023/0291794 | A1* | 9/2023 | Bartholomew ....... H04L 67/101 |
| 2023/0297356 | A1* | 9/2023 | Hudson ................... G06F 9/547 717/177 |
| 2023/0376558 | A1* | 11/2023 | Seyfi ....................... G06N 3/045 |
| 2024/0050803 | A1* | 2/2024 | Lee ........................ G06V 20/46 |
| 2024/0142263 | A1 | 5/2024 | Gottin et al. |
| 2024/0143655 | A1 | 5/2024 | Freund et al. |
| 2024/0144174 | A1 | 5/2024 | Freund et al. |
| 2024/0362808 | A1 | 10/2024 | Del et al. |

OTHER PUBLICATIONS

Errandonea, Itxaro et al., "Digital Twin for Maintenance: A literature review", Computers in Industry 123 103316, Elsevier, Oct. 5, 2020.

Hornung, A. et al. (2013) 'OctoMap: An efficient probabilistic 3D mapping framework based on octrees', Autonomous Robots, 34(3), pp. 189-206. doi: 10.1007/s10514-012-9321-0.

Hubel et al., Coverage Control with Information Decay in Dynamic Environments, 2008.

McMahan, Communication-Efficient Learning of Deep Networks from Decentralized Data, version 3, Feb. 28, 2017, Artificial Intelligence and Statistics, pp. 1273-1282.

N. Hubel, A. Gusrialdi, H. Fujita, and O. Sawodny, "Coverage Control with Information Decay in Dynamic Environments," Jan. 2008.

Tao, F et al., "Chapter 2 -Applications of Digital Twin", Digital Driven Smart Manufacturing, Feb. 15, 2019, pp. 29-62, https://doi.org/10.1016/B978-0-12-817630-6.00002-3.

U.S. Appl. No. 18/049,700, filed Oct. 26, 2022, titled SO-MAP: A Semantic-Aware Algorithm for Optimizing the Representation Structure of Octomaps.

U.S. Appl. No. 18/050,274, filed Oct. 27, 2022, titled Orchestration of Action-Input Representations for Decision Making in Edge Environments.

Wurm, K.M. et al. (2011) 'Hierarchies of Octrees for Efficient 3D Mapping', (Sep.). doi:10.1109/IROS.2011.6048189.

* cited by examiner

EXPLOITING STRUCTURE IN ENVIRONMENT SENSOR DYNAMICS FOR REAL-TIME MAXIMIZATION OF INFORMATION GAIN

FIELD OF THE INVENTION

Embodiments of the present invention generally relate to obtaining information concerning the state and operation of a physical environment. More particularly, at least some embodiments of the invention relate to systems, hardware, software, computer-readable media, and methods for a central node to efficiently determine which grouping of edge nodes in a physical environment will maximize the knowledge, by the central node, of the state of the physical environment, given a particular set of tasks that are executing in that physical environment.

BACKGROUND

One edge space that has attracted interest is smart services for mobile edge units, for instance, in the logistic or retail space, where there may be multiple agents under orchestration to perform a variety of tasks. One such environment might include a central near-edge processing node that orchestrates a set of tasks and actions to be performed in the environment and a large fleet of agents as far-edge mobile units. These units have sensing capabilities that are communicated via shared channels to the near-edge node which integrates them in the form of a global map to monitor and orchestrate tasks in the environment. Static sensors may be employed in the environment, such as security cameras for example. While such physical environments may be beneficial in some respects, various problems remain.

For example, it may be difficult to keep the representation of the global map in the near-edge node, relevant for the tasks under execution, as accurate and synchronized as possible with respect to the actual environment. Another problem relates to the number of far-edge nodes. In particular, problems may arise when the number of far-edge nodes is large enough to exceed the communication bandwidth of the shared channels, and/or the number of far-edge nodes is large enough to overtax the processing resources, such as memory and computation for example, available in the near-edge node.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
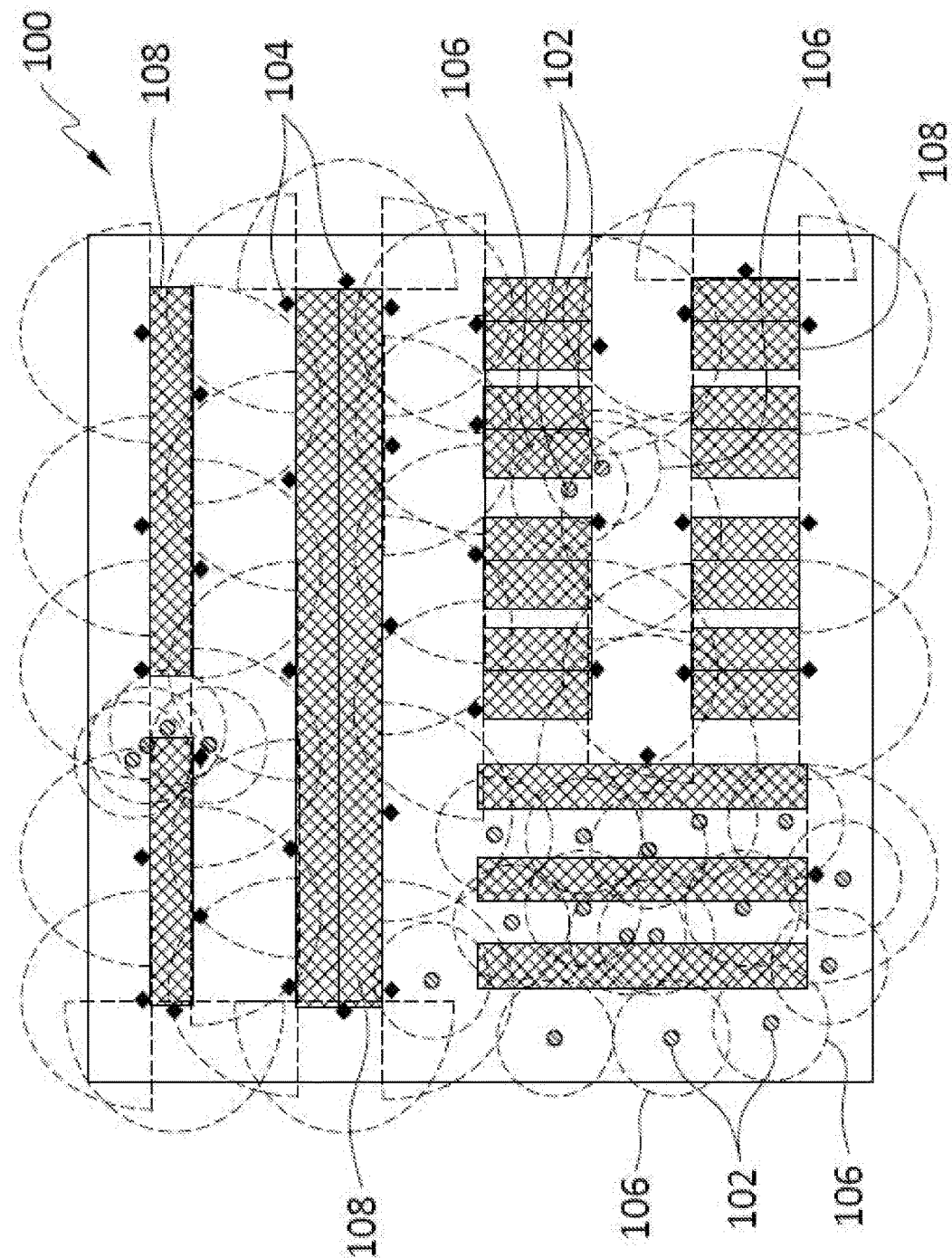
FIG. 1 discloses aspects of an example operating environment according to one embodiment of the invention.

Embodiments of the present invention generally relate to obtaining information concerning the state and operation of a physical environment. More particularly, at least some embodiments of the invention relate to systems, hardware, software, computer-readable media, and methods for a central node to efficiently determine which grouping of edge nodes in a physical environment will maximize the knowledge, by the central node, of the state of the physical environment, given a particular set of tasks that are executing in that physical environment.

In general, one example embodiment of the invention may comprise a method that determines the best set of information, arising from a group of sensors in an environment such as a physical environment, at each time step in a group of time steps. These sensors may be selected by a central near-edge node to maximize, for the central near-edge node, the joint knowledge of the environment, considering a given set of tasks executing in the environment. In this way, an embodiment may avoid collecting information from the environment that is unnecessary because that information is already known, provided by another sensor, or is not relevant or impactful for the set of tasks that is executing.

A method according to one embodiment may comprise sampling a group of nodes, such as far-edge nodes, that are grouped into cluster structures and based on information obtained from the sampled nodes, updating an information map, which may be a global map of an environment, so as to maximize the total area of coverage of the information sampled from the far-edge nodes. The global map may be used to monitor and orchestrate tasks in the environment, and the updating may accordingly include updating the most outdated states in the environment that are relevant to perform a given set of tasks executing, or to be executed, in the environment. As well, the method may include updating an attention mechanism which operates to control retrieval of information from those regions of the environment expected to produce the most relevant information. When the various regions have been identified, the best sensors in those regions from which to obtain information, such as measurements, may be selected. When processing the measurements, the near-edge, or central, node may also update the environment state to orchestrate the tasks and actions in the environment.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the collection of extraneous or irrelevant information concerning the state of an environment may be avoided. In an embodiment, an amount of information relevant to the state of an environment may be maximized. Various other advantages of one or more example embodiments of the invention will be apparent from this disclosure.

A. Context for an Example Embodiment

One example embodiment comprises an efficient method for identifying the best far-edge nodes from which to obtain information while also mitigating the communication and processing strains, attendant to such information acquisition, in the system. An example embodiment may employ an information-based framework to select mobile edge units that best improve the joint knowledge of the environment state that is relevant for the tasks performed in that environment. This knowledge may be used, for example, to improve the operational efficiency and security in the environment.

In the context of an example embodiment of the invention, 'information gain' generally embraces a measure of the expectation that a specific content in the global map of an environment is in sync with the actual state of the environment. The maximization of the information gain may enable striking of a balance between two aspects relevant to the execution of the tasks in the environment, namely, the aspects of updating the most outdated states in the environment that are relevant to perform the tasks, and maximizing the total area of coverage of the information sampled from the far-edge nodes. In this way, an embodiment of the invention may avoid sampling of frivolous information, examples of which include: information from nearby far-edge nodes, that is, far-edge nodes located close to a central node; information from nodes at positions already updated in the recent past; and/or, information from nodes whose information is irrelevant to the tasks being, or to be, executed in the environment. In order to enable close-to-real-time execution, an embodiment of the invention may perform simplifications in the algorithm based on heuristics that apply to several application scenarios.

With further attention to "information gain", as used herein, information gain may be thought of as an improvement, or increase, in the knowledge concerning the state of an environment. By way of illustration, suppose that an environment is in a state1, where state1 indicates what is believed to be known about the environment. Later, updated information is obtained that provides a more accurate picture, state2, of the environment. The change, or delta, between the information about state1 and state2 may be referred to as the 'information gain' concerning the environment. One embodiment of the invention may thus operate to maximize an information gain relating to an environment. Further discussion of information gain is provided elsewhere herein.

In more detail, an example embodiment of the invention may comprise one or more useful aspects. For example, an embodiment may comprise a real-time algorithm that exploits the structure of the sensors in the environment to maximize the information gain for a set of given tasks performed in the environment and maintains the structure of the sensors up-to-date by requiring only evaluation of potential perturbation, mitigating the computational impacts for real-time operation. Together, these two aspects allow an up-to-date state of the environment to be kept in a central (near-edge) node with less computational requirements.

B. Detailed Description of Aspects of an Example Embodiment

For the purposes of facilitating the discussion, but not so as to limit the scope of the invention in any way, it may be assumed that there is a large fleet of sensor-equipped mobile far-edge units that share communication channels therefore resulting in communication and processing strains in the system. Several static sensors may be additionally employed further enhancing the computational strains in the system. It might further be assumed that these sensors may have the benefit of individual wired communication channels, but the scope of the invention extends more generally to embrace a general framework that also addresses the cases where the sensors or other devices share communication channels with the mobile far-edge units.

B.1 Example Operating Environment

One example configuration of an environment 100, in connection with which an embodiment of the invention may be employed, is disclosed in FIG. 1. The example operating environment 100 may comprise one or more sensor-equipped mobile edge devices 102, and static, that is, non-mobile, sensors 104. The maximum area of coverage of a sensor carried by a sensor-equipped mobile edge devices 102, or of a sensor 104, is indicated by a respective dashed region 106. The shaded areas indicate space 108 that is occupied, such as with shelving, storage units, or other structures, for example. The sensor-equipped mobile edge devices 102 may not be able to travel in or through the space 108 due to the presence of such structures.

With the example environment 100 in view, one example embodiment may operate to determine the best set of information that can be obtained from a set of sensors [m*] at each time step [t] to be selected by a central near-edge node to maximize its joint knowledge [K(t)] of the environment 100, considering the set of tasks [T] in execution in the environment 100. Put another way, an embodiment of the invention may avoid the collection of unneeded extraneous information from the environment either because [1] that information is already known, [2] the information may be obtained from another sensor, and/or [3] the information is not materially related to, or needed for, the tasks in execution in the environment 100.

B.2 Example Execution Pipeline

Figure 2:
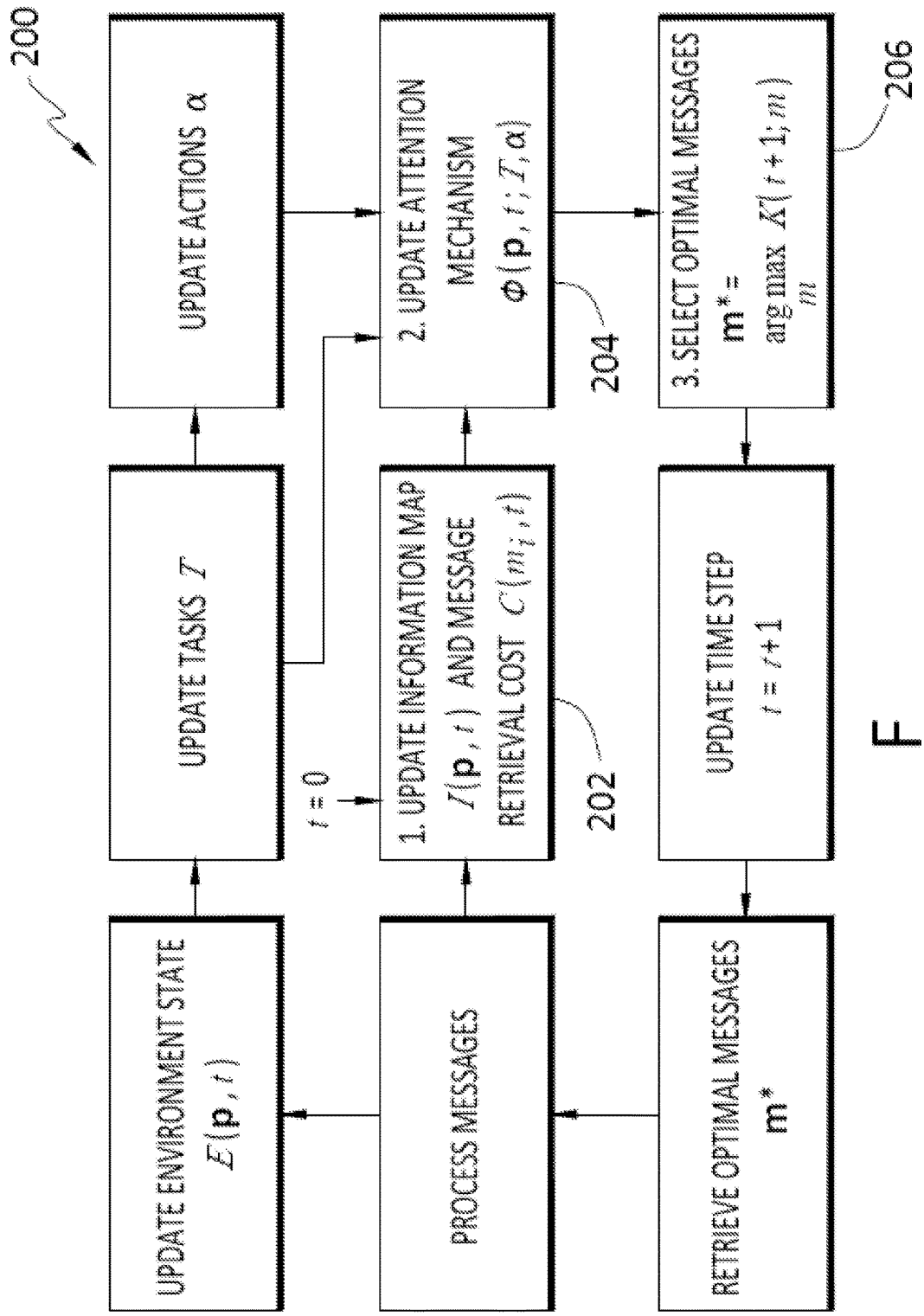
FIG. 2 discloses aspects of an execution pipeline according to one example embodiment of the invention.

An example execution pipeline 200, comprising operations implemented at each time step [t], is disclosed in FIG. 2. In particular, FIG. 2 discloses an example execution pipeline 200 that may be executed by a near-edge node at each time step [t]. One example embodiment of the invention is particularly concerned with operations 1. (update information map 202), 2. (update attention mechanism 204) and 3. (select optimal messages 206), discussed in more detail below. As disclosed in FIG. 2, only the most relevant information from set of sensors [m*] for the set of tasks [T] is employed at each time step [t]. This approach may mitigate computational and communication strains in the environment 100 while also providing maximum joint knowledge returns.

It may be implicit in this approach however that the computational burden to perform the computations to select the optimal information [m*] with a method according to one embodiment must be lower than actually retrieving more, but not optimal, information [m̂] by taking advantage of the extra computation budget available when employing a less expensive selection method, such as random selection or round robin for example. Under conditions of some typical edge applications, where the environment 100 size and number of devices is large enough to frequently create structures with concentration of available sensors 102/106 in given neighborhood and high dynamic behavior, then selecting [m*] instead of [In] may yield superior results, as noted earlier herein.

As noted above, an embodiment of the invention may place emphasis on the operations, possibly performed by a central node, 202, 204, and 206 disclosed in FIG. 2, particularly, updating an information map, updating an attention mechanism, and selecting the optimal messages, from the various sensors. With regard to the messages, the information gathered by a sensor or other far-edge device may take the form of messages, some of which may be useful and some of which may be not. By selecting on a message basis rather than a sensor basis, where the message comprises a portion of a sensors data, an embodiment of the invention may take a relatively more granular approach to the information selected for use in implementing one or more functions of an embodiment of the invention. Alternatively, however, an embodiment may select the best sensors from which to retrieve measurements.

When processing the measurements, a near-edge node, which may also be referred to herein as a 'central node' that communicates with far-edge systems/devices and associated sensors, may also update the environment 100 state to orchestrate the performance of tasks and actions in the environment 100.

B.3 Terms
B.3.1 Edge Environment

Following is a discussion of some concepts and terms that are used in connection with the description of the structure and operation of an edge domain, such as the environment 100 for example. Note that while reference is made to a logistics domain, such as a warehouse for example, such reference is for the purposes of illustration, and is not intended to limit the scope of the invention in anyway.

'Near-edge node' is a central node to which all sensors and agents are connected—the near edge node may have considerable storage and processing capabilities;

'time step $t \in \mathcal{N}$' refers to a (discrete) update cycle of the near-edge node;

'message mi $\in \{0,1\}^{li}$' is a finite binary code of length [li] transmitted through communication channels between the near-edge node and the agents or vice versa—it provides information, but at the expense of using resources;

'$\mathcal{M} = \{m_i | l(mi) \leq l_{max}\}$' denotes the set of all possible messages that can be transmitted, where $l_{max}$ is the maximum message length and $l(\cdot)$ maps a message to its length;

'resource $r_i \in \mathcal{R}$' is a technical component employed to provide some functionality within the environment with finite capabilities—within the context of this embodiments disclosed herein, some major resource types are:
  communication bandwidth between the near-edge node and the agents;
  computational processing power of the near-edge node;
  available (transient) memory in the near-edge node; and
  any other resources that may be applicable in a given set of circumstances, such as battery supply levels where battery powered components are employed.

An embodiment of the invention may refer to the set of all resources as $\mathcal{R} = \{r_i | i \in \mathcal{N}+, i \leq r\}$ with [r] being the total number of finite resources.

'agent' is a mobile far-edge unit capable of performing local interactions with the environment—some examples of agents include, but are not limited to, Automated Mobile Robots (AMR), sensor-enhanced forklifts, augmented humans (in the sense of industry 5.0);

'tasks T' refer to tasks performed by the central node at each time step [t] cycle by an "update tasks" algorithm—note that the function τ(t) provides the set of tasks [T] being performed at time step [t]—the tasks may be used in the information modelling to prioritize retrieving a particular set of information, and may relate to the global management and optimization of the environment 100. Some example tasks that may be involved in an embodiment of the invention include, but are not limited to:
  planning (determining necessary action sequences by the edge nodes)—in one embodiment, a typical task in a logistics warehouse domain is to determine a loading order of packages into a truck—this task may involve, for example, the movement, loading and unloading of pallets, by multiple forklifts and AMRs;
  reasoning (informing other tasks)—inn one embodiment, a typical task that is applicable to many kinds of domains is the prediction of time-to-finish of actions—in a logistics warehouse domain, for example, the central node should typically need, for the purposes of planning and orchestration, to predict the time for an AMR to go from A to B, for the time for the AMR to unload a certain pallet, and/or the time for an AMR to load a package onto a trailer; and
  reporting and visualization—the central node may require up-to-date information of operations to generate reports to expert users.

'actions [a]' are local decisions required to complete a task—the function a(t) provides the set of actions [a] being performed at time step [t]—like tasks, actions may be used in the information modelling to prioritize retrieving a particular set of information—these can be computed either the near-edge node or by the agents, and some actions may be performed by the agents, but some can be triggered by the near-edge node—during the execution of an "update actions" algorithm, the actions may be communicated via a message to the agents when computed by the near-edge node, otherwise the agents may communicate their decisions to the near-edge node, or 'central node'—some example actions in an embodiment—again with reference to the non-limiting warehouse example—include, but are not limited to:

navigation and pathfinding—resolving the necessary movement to go from point A to B in the warehouse, and consider proximity sensors, LIDAR (light detection and ranging), and computer vision models to navigate around obstacles in the way;

interacting with the environment—the agent and the near-edge node may modify the environment status—examples of interactions that may be performed by the near-edge node include, but are not limited to, opening a door, and activating alarm sounds, while agents may pick, move, drop objects, or even manually activate mechanisms within the environment, such as opening or closing doors for example; and parametrizing the operation of the edge node—a mobile device may determine that, based on a current context, it should operate more slowly to avoid accidents.

B.3.2 Information Retrieval

In an embodiment, various types of information may be retrieved from various sources. Regarding information retrieval, one example embodiment may involve the following concepts:

"monitored environment" $D \in \mathfrak{R}^3$ is the region in an edge environment to be monitored, and may comprise all the space where the agents are expected to perform actions—note that the framework according to one embodiment may be equally applied when $\mathcal{D} \in \mathfrak{R}^2$ if such representation is appropriated with regard to the application requirements—in an embodiment, a point or position in the environment is denoted with $p \in D$;

"environment entity" is any asset or object within D;

"sensor" $si \in \mathcal{S}$ provides measurements about the state of the environment and any entities within the environment at a given time step [t];

$S=\{s_i | i \in \mathbb{N}+, i \leq n\}$ denotes the set of all sensors in the environment with n being the number of sensors;

sensors can be of various types, such as cameras, depth sensors, LiDARs, RFID (radio frequency identification) readers, thermometers, acoustic sensors, and motion sensors, for example—typically, no individual sensor is able provide complete observation of an environment—static sensors only collect information about the environment, while other sensors may be carried by agents and collect information regarding the operations of the agent;

the measurements from the sensors may be provided to a near-edge node via a message mi—note that while the measurements can be split in several messages such as, for example, one message per pixel, cloud point, for simplicity of exposition, the whole set of measurements provided by a sensor may be considered as a single message—note however that the framework according to one embodiment is generic and can determine which measurement point is useful to be retrieved;

the function $A(m_i, t)$ maps a message to additional context regarding the nature of the message—as such, it may be relevant for information modeling choices, as the choice of model or its parametrization, as discussed elsewhere herein—examples of such additional context include, but are not limited to: [1] properties of the sensor nature, such as its type, quality (associated uncertainty) and specific parameters of interest; [2] the position of the sensor; [3] the quality of the message or source channel, for example, how noisy or lossy is the compression applied; and, [4] other potential external interferences that might affect the message—these could be potential additional functions to be part of the modeling or affect the parametrization, as potential conditions where information from a particular sensor is known to perform poorly—one example would be a model or reparameterization considering the impact of fog, or rain, in the information retrieved from a sensor comprising a camera or LiDAR;

One "agent" may have multiple "sensors"—thus, $\mathcal{S}_{ai} \in \mathcal{S}$ and $\mathcal{M} \mathcal{S}_{ai} \in \mathcal{M}$ respectively denote the set of sensors, and possible messages from these sensors of an agent $[a_i]$;

"environment state" E(p, t) determines what is known about the environment at a given time step [t], that is, the environment state is a map of the environment as the environment exists at a time step [t]—the specific embodiment of [E] depends on the map framework employed—examples of [E] include OctoMap, SO-Map, and signed distance fields—while the specific form of the content of E(p, t) may vary with the specific embodiment employed, its state nature pertains to information related to occupancy, for example, whether a position [p] is occupied, or free, or any information which allows computing such a property, such as the occupancy probability for example—note that the algorithm "update environment state" is responsible for parsing messages from sensors and determine the current environment state S(p, t);

"budget" $b(t) \in (\mathfrak{R}+)^r$ determines the total availability of resources for retrieving and processing a message—in an embodiment, the budget is a vector, where each scalar is associated to a finite resource $r_i$—the budget may be a function of the time step [t] since the near-edge node resource availability is subject to the operation of other algorithms, such as those algorithms dedicated to orchestration of the edge environment—note that the budget may be reduced by the resource requirements of the main algorithm dedicated to the selection of the best messages, and these requirements can be obtained during operation by slowly increasing parameters affecting the computational burden to find the best compromise between the algorithm efficiency and budget requirement;

"Message retrieval cost" $ci=C(m_i, t; A): \{0,1\}^{li} \times \mathbb{N} + \to (\mathfrak{R}+)^r$ determines the estimated cost associated with retrieving and parsing information of a given message—the nature of the message [A] may be employed to define the specific form of [C] for each $[m_i]$—the specific model may be determined empirically, by collecting the messages under experimentation and properly adjusting an appropriated function to determine the requirements in each finite resource $r_i$.

B.3.3 Information Modeling

The following discussion concerns aspects of a base framework such as may be employed in an embodiment of the invention:

"Information Gain" $G(p, m_i, t; A): \mathcal{D} \times \mathcal{M} \times \mathbb{N} + \to \mathfrak{R}_{+,0}$ is a templated function determining the expected information gain at each position p for a given message $m_i$—one example of a template for a circumstance in which the sensor uncertainty grows quadratically with distance is provided in Hubel (equation (4))—other templates may be modelled and parametrized appropriately considering the sensor particularities of each application.

"Information State Update" (below)

$$\delta/\delta_t I(p,t;A,\tau,\alpha): \mathcal{D} \times \mathcal{N}^+ \to \mathfrak{R}$$

is computed at δt each time step.

It has an additive form δ/δt I=G-D, where the components are:

"Total Information Gain" G(p, t; A)=$\Sigma m_i \in$m*(t) G(p, $m_i$, t; A) provides the maximum possible gain for the selected messages m*(t) at time step [t]—note that the possible message choices grow through a combinatorial problem, namely, m*∈ powerset($\mathcal{M}$ t), where $\mathcal{M}$ t∈$\mathcal{M}$ are the possible message choices at time step [t]. In an unconstrained environment, the best choice is Mt whenever the template image is $\mathfrak{R}^+$.

"Information Decay" D(p, t; m*({1, ..., t-1}), A, τ, α) defines the decaying behavior—it can be defined as a piece-wise function—an embodiment of the invention may allow its parametrization to be a function of:

All the previous retrieved messages m*({1, ..., t-1}), so that the decay can be modelled considering the specific context of a message through the usage of A; and The on-going tasks τ(t) and actions α(t), thus adjusting the decay strength in specific regions and accordingly to their severity.

Potential modeling choices for each compound function are:

Linear, for example, D(p, t)=γ; and

Exponential, for example, D(p, t)=βI(p, t-1).

"Information State Map" S(p, t; A): $\mathcal{D} \times \mathcal{N}^+ \to \mathfrak{R}$ provides a value proportional to the confidence level of each environment state E(p, t). While several forms may be employed, the following modeling approach is provided as an example:

$$S(p,t;A)=h(I(p,t;A))$$

This example function [h] is a (saturating) non-linear function to model the desired behavior of maximizing the area of coverage and to avoid the information decaying indefinitely. Depending on the optimization approach employed, the saturation can be soft or hard. For example, if neural optimization is used, [h] may take the form of a sigmoid with some parametrization, for example, tanh(I(p, t; A)-5)+1) function, or a clipping function such as max(I(p, t; A), $I_{max}$))) if integer programming is employed. The function I(p, t; A) is the so far accumulated information, and may be initialized at t=0 with all values mapping to zero or any other boundary condition if there is a hot start mechanism.

"Mission-Oriented Attention-Mechanism" φ(p, t; τ, α): $\mathcal{D} \times \mathcal{N}^+ \to [0,1]$ enables control of the regions in which retrieving information is most relevant. It is noted that the parametrization based on both the tasks and actions enables the attention mechanism to optimize information retrieval considering the current action but also for possible sets of next actions, therefore balancing local, and global, decisions. It also typically takes a compound form with the number of functions $f_i$ employed proportional to the tasks and actions and their complexity. A typical approach is $$\varphi(p,t;\tau,\alpha)=\max_i f_i(p,t;\ldots).$$

Possible choices for $f_i$ could be, for example:

1. Mapping positions within a cylinder with radius [r] and center [c] to 1, for example (ignoring z-axis) $f_i$(p, t)=$\{_\in^1$ if $(p-c)^2$<r2, otherwise. Where ∈ is a small non-zero value to allow retrieving more information on non-priority regions if remaining resources are still available;

2. As in 1, but decaying $f_i$ as a function of r, as the example provided for the information gain G;

3. Other shapes can be considered, squared or rectangular base regions; and

4. The shape can also be adapted accordingly to the particular mission goal, for example, the shape may span over only navigable space when considering the task of avoiding dangerous cornering events for example.

"Mission-Aware Joint Knowledge" K(t): $\mathcal{N}^+ \to \mathfrak{R}$ provides a value summarizing the total precision of the information contained in the regions that may be important for the edge application to perform the current tasks and actions, which may collectively be referred to herein as a "mission." To focus on information that is relevant to the mission, an embodiment may consider a form composed by a convolution of the time-variant attention-based mechanism φ with the information state map S as in K(t; A, τ, α)=$\Sigma_p$ S(p, t; A)φ(p, t; τ, α). It is noted that the multiplicative approach convoluting φ and S in such way enables φ to arbitrarily change while still conserving the state of previous information in S. Therefore, the edge application can appropriately select the best messages to retrieve information whenever it updates φ to new configurations. In other words, φ can be a rough approximation of the actual regions of importance and change in arbitrary ways, such as fast movement in the environment, and the optimization procedure described elsewhere herein is still able to perform well.

"Message Content Overlap" O(mi, mj): $\mathcal{M} \times \mathcal{M} \to \mathfrak{R}+$, 0 determines how much retrieving a message impact on the net information state gain of another message, that is O(mi, mj, t; A, τ, α)=$\Sigma_p$ h (G(p, mi, t; A)-G(p, mj, t; A)+I(p, t))φ(p, t; τ, α). Simplifications may be applied by using approximations to the immediately preceding expression. For example, an embodiment may limit computations to $\mathcal{P}_{mi}$ regions where G(p, $m_i$, t; A) is large, that is, $\mathcal{P}_{mi}$={p|G (p, $m_i$, t; A)>ε} where ε is an arbitrary value. The $\mathcal{P}_{mi}$ regions may be referred to as core gain regions. Provided core regions $\mathcal{P}_{mi}$ and $\mathcal{P}_{mj}$, then it is possible to return 0 and avoid above computations if either: $\mathcal{P}_{mi}$ and $\mathcal{P}_{mj}$ lies on regions where φ(p, t; τ, α) is sufficiently small; or $\mathcal{P}_{mi}$ does not overlap with $\mathcal{P}_{mj}$.

C.1 Example Embodiment of an Algorithm

With reference again to the example of FIG. 2, following is a discussion of the example operations 202 ("Step 1" below), 204 ("Step 2" below), and 206 ("Step 3" below).

Step 1.

a. Set I(p, t=0; A, τ, α)=0, ∀p (only run once at initialization).

b. Update information map: I(p, t; A, τ, α)+=$_{dt}^d$ I(p, t; A, τ, α); and c. Estimate message retrieval cost $c_i$=C($m_i$, t; A). This can be performed with lazy evaluation, for example, only for messages potentially selected.

Step 2. Update Mission-Oriented Attention-Mechanism φ(p, t; τ, α). Note that the tasks [T] and actions [α] at the current time step are computed by the near-edge node considering the environment state E(p, t) based on information obtained in the previous time-step selected messages m*(t-1).

Step 3. Determine the next best messages m* to be used from the possible messages in the current time step Mt by performing the maximization of the estimated mission-aware joint knowledge $\hat{K}_{in}$ the next time step constrained by the available resource budget as in:

$$m^*(t) = \underset{\mathcal{M}}{\arg\max}\, \hat{K}(t+1; A, \tau, \alpha, \hat{\mathcal{M}}),$$

subject to:

$$\sum C(m_i, t; A) < b(t)$$
$$m_i \in \hat{\mathcal{M}}.$$

C.2 Example Algorithm for Solving Step 3

The maximization described in the aforementioned "Step 3" is a combinatorial problem over a power set of all messages available at time step t. In an embodiment, some problem-specific heuristics can be useful to reduce the computational complexity of the solution space and, consequently, the resources required to select the optimal messages m* at a given time step [t].

This part of the discussion concerns some simplifications that may be applied in the problem to enable an embodiment to be more efficiently executed online and, therefore, enabling the embodiment to perform better than naïve approaches like round-robin and random selection. This approach considers that solely messages nearby the previously selected message are affected, therefore avoiding recomputing ^K for every remaining message whenever there is a greedy selection of a message. An embodiment of an algorithm for solving step 3 may proceed in the following way:

1. Let $m^*(t) = \emptyset$ and $\mathcal{M}' = \mathcal{M}\, \mathcal{M}$ ;
2. For each message $mi \in \mathcal{M}'$, compute the maximum expected mission-aware joint knowledge contribution $k_i$, that is, $k_i = \hat{K}(t+1; A, \tau, \alpha, \mathcal{M}\, t=mi)$;

Aggregate the contributions in a vector $k = \{k1, \ldots, k\mathcal{M}'_t\}$. Note that similar approximations as discussed for the message overlap content O( . . . ) may be employed here to speedup online computation.

3. Perform the greedy selection algorithm:
    i. Pick the message with highest contribution $g$ — the contribution can be measured as:
        a. Solely considering $g = k_i$;
        b. Some statistics of the ratio between $k_i$ and its resource cost $C(m_i, t; A)$, e.g. $g = k_i/\|C(m_i, t; A)\|$ or $$k_t / \max_j \frac{c(m_i t; A)_j}{\widetilde{b(t)}_t},$$

where $\widetilde{b(t)}$, is the remaining budget considering the already selected messages;
        c. Evaluate the resource condition:

$$\sum_{mj \in mi \cup m*(t)} C(mj, t; A) < b(t)$$

if not satisfied, stop the algorithm and return $m^*(t)$— note that it may be possible to perform a search algorithm on messages within available budget;
        d. Let the selected message with highest contribution $g_i$ be $m_i$, then append it to the selected messages $m^*(t) = mi \cup m^*(t)$;
        e. Remove $m_i$ from $\mathcal{M}'_t$;
    ii. Let $\mathcal{M}'_{mi} = \{m_j | O(m_i, m_j) > O_{min}, m_j \in \mathcal{M}'_t\}$ be the messages in which selecting $m_i$ are greatly affected. Then update $k_j = O(m_i, m_j) \forall kj \in \mathcal{M}'_{mi}$;
    iii. Repeat step 3.

The greedy selection algorithm discussed above for solving the aforementioned "Step 3" generally works well. It is noted, however, that step 3.ii of the greedy selection algorithm requires using the approximations discussed in paragraph [0037] under "Message Content Overlap". This approach can in some embodiments result in the following problems whenever ϕ is not negligible at a sufficiently large area of the environment, which is the case, for example, when security is a concern and therefore knowledge of the environment state must be as up-to-date as possible, but also when the number of tasks are large:

1. For each selected message $m_i$, it is required to compute the overlap between $\mathcal{P}_{m_i}$ and $\mathcal{P}_{m_j}$ for all $m_j \neq m_i$ which is a computationally intensive operation whenever $\mathcal{M}_t$ is large.
2. It is possible to alleviate the above problem by considering surrogate functions, e.g. by leveraging a distance matrix. However, these functions may ignore relevant properties of the environment. For example, occlusions are ignored whenever using a distance matrix. Since occlusions are common in the use cases of this inventions, a better approach to capture the environment structure is required.
3. Even when the surrogate function is a reasonable update at the first-order relationship, it cannot capture how the sampling impact scales when the number of samples is large. In such cases, it is required to ensure that the approximation is good enough and this requires a more efficient approach.

E. Aspects of an Algorithm for Leveraging Edge Environment Structures

The embodiments disclosed herein provide an algorithm for solving the aforementioned "Step 3" that deals with the problems stated above by noting that a typical edge environment possesses the following properties:

1. Environment size and number of devices are large enough to frequently create structures with concentration of available sensors in a given neighborhood; and
2. The environment is highly dynamic, so it is not possible to capture a static representation of the typical structure of the environment and exploit it to our advantage. Despite the dynamicity of the environment, it is possible to assume that the time step update frequency is sufficiently small in such a way that the environment structure in a next time step still roughly resembles the previous one.

Based on these properties, it is possible to create cluster structures representing groups of sensors where the choice of sampling a message within the group affects the contribution of other messages. Therefore, embodiment keeps track of the concentration structure of sensors in the edge environment to allow only recomputing the impact in other messages that are mostly affected when a message is considered to be sampled, i.e., only those nearby sensors. In other words, it avoids dedicating computational resources to recompute negligible changes. Due to Property 2, it is updated at each time step to keep track of the current structure, which makes this algorithm computationally cheap.

Figure 3A:
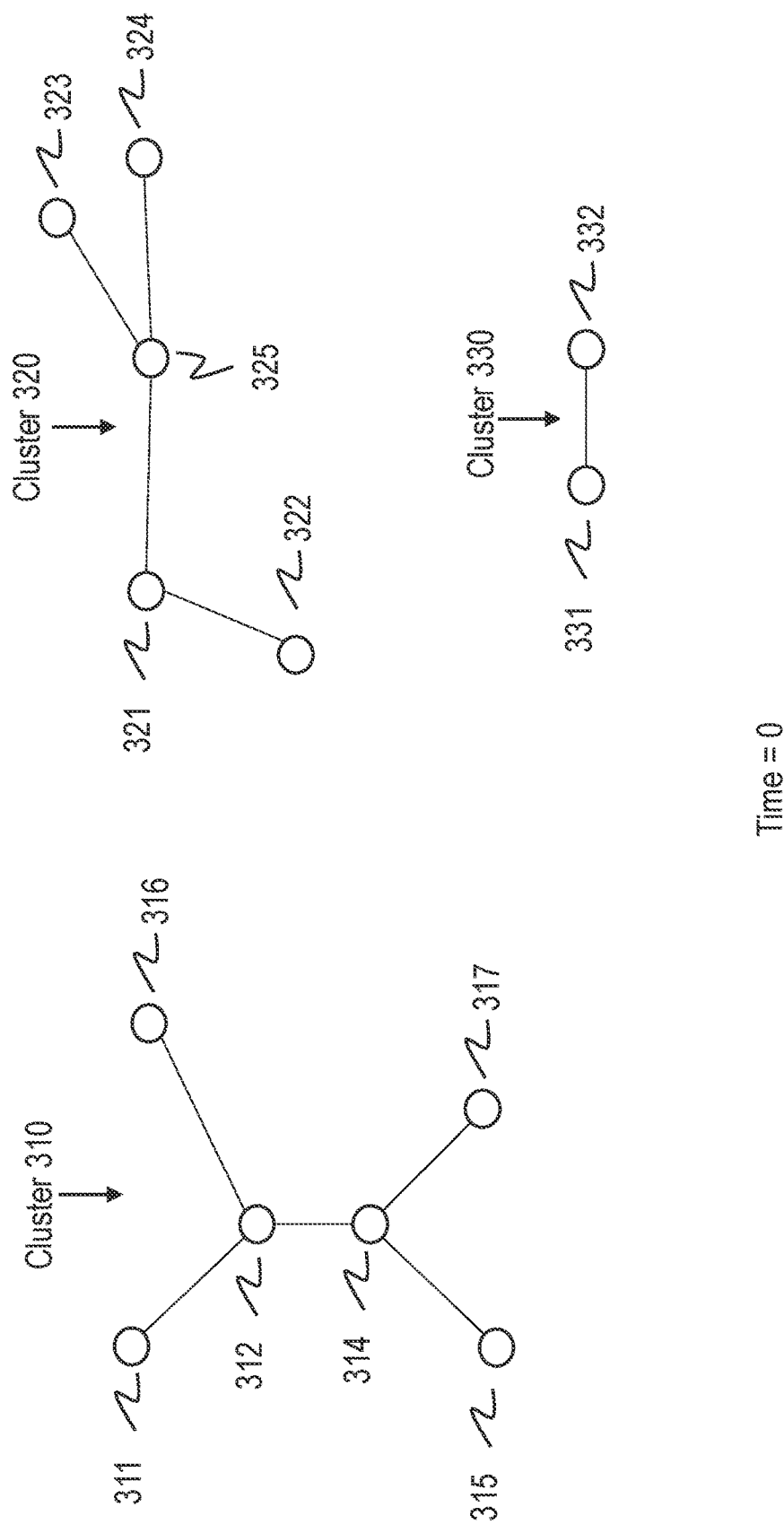
FIGS. 3A-3C disclose aspects of cluster structures according to one example embodiment of the invention.
Figure 3B:
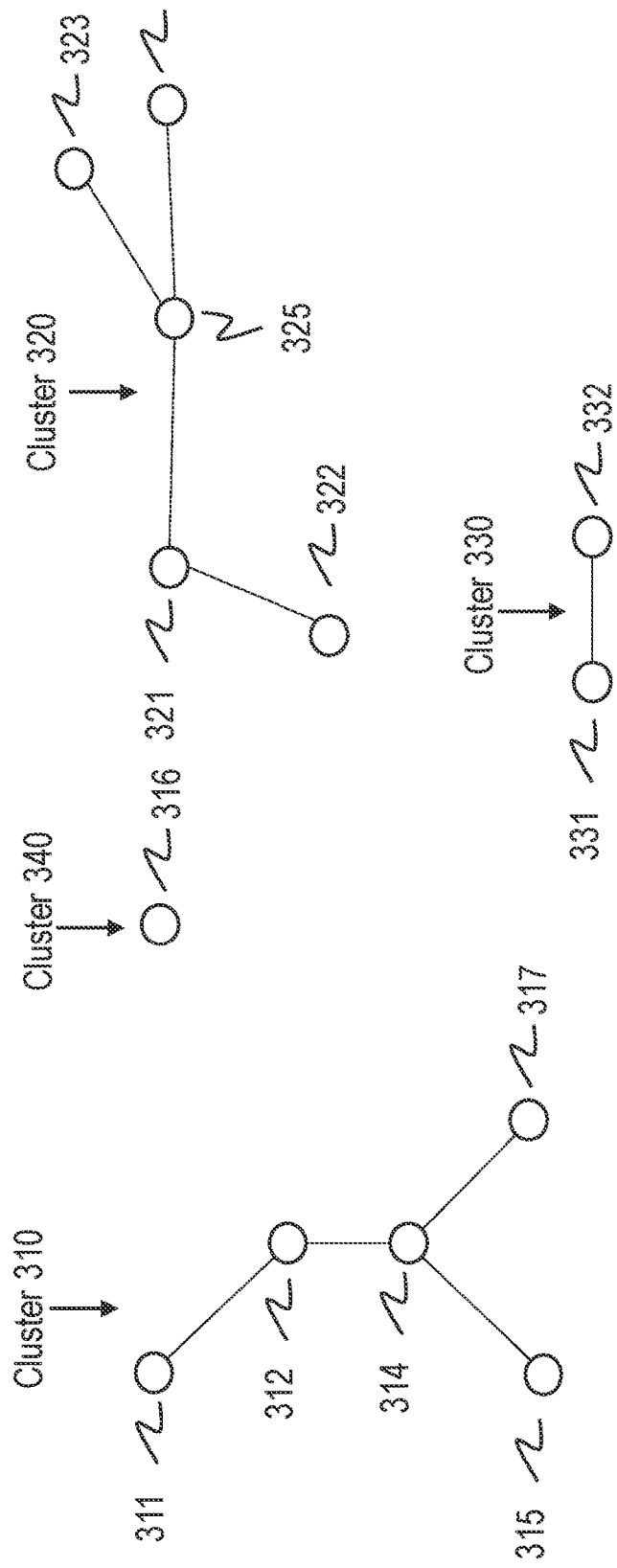
Figure 3C:
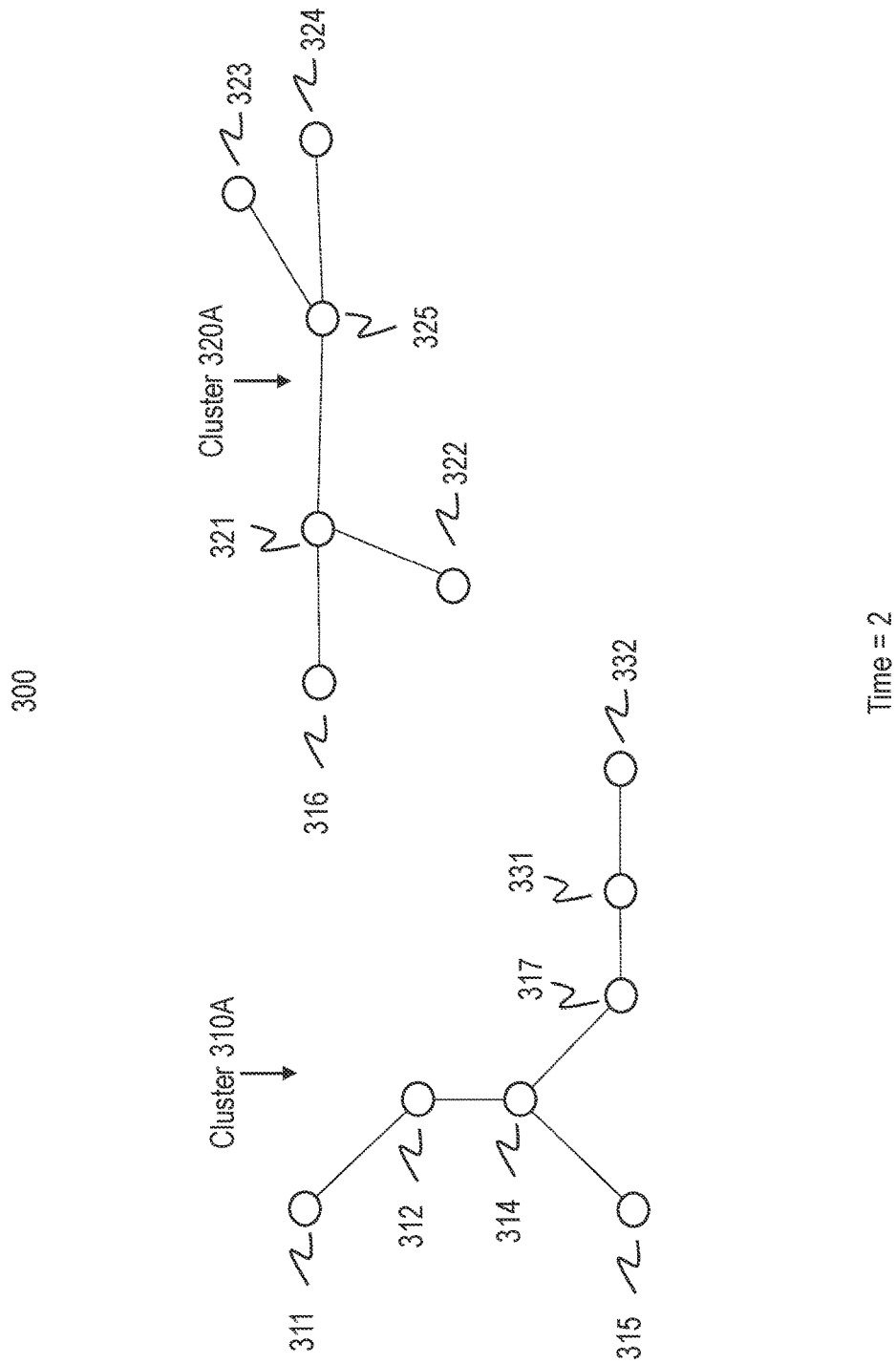

FIGS. 3A-3C graphically illustrate the embodiment of the algorithm for solving the aforementioned "Step 3". The algorithm will then be described in more detail. It will be appreciated that the cluster structures shown in FIGS. 3A-3C are logical structures created by the algorithm to mimic the real world sensors in the edge environment.

For example, FIG. 3A illustrates an example edge environment 300 such as the edge environment 100 that includes the mobile sensor equipped devices 102 and the static sensors 104, which are agents that operate in the edge environment 300. As shown in FIG. 3A, the mobile sensors and static sensors can be grouped into different cluster structures of sensors. That is as according to Property 1 above, there are number of sensors that are concentrated in a given neighborhood that can be grouped into a cluster structure.

For instance, a cluster 310 includes sensors 311-317 that are logically connected to each other due to their relatively close proximity in the edge environment 300, a cluster 320 includes sensors 321-325 that are logically connected to each other due to their relatively close proximity in the edge environment 300, and a cluster 330 includes sensors 331 and 332 that are logically connected to each other due to their relatively close proximity in the edge environment 300. In one embodiment, the cluster 310 may include a combination of mobile and static sensors at first location in a warehouse, cluster 320 may include a combination of mobile and static sensors at a second location in a warehouse, and the cluster 330 may include a combination of mobile and static sensors at a third location in a warehouse. This is why the sensors in relatively close proximity are logically connected to each other. FIG. 3A can be considered an initial time period (time=0) in the edge environment 300.

FIG. 3B illustrates a first time period (time=1) in the edge environment 300. As shown in FIG. 3B, the sensor 316, which is mobile sensor, has moved far enough away from cluster 310 and is now considered its own cluster 340. In addition, the cluster 330 has moved closer to the cluster 310. This illustrates the dynamic nature of the edge environment 300. However, even though there have been some changes in the cluster structures between the initial time period (time=0) and the first time period (time=1), the cluster structures in the first time period (time=1) still roughly resemble the cluster structures in the initial time period (time=0).

FIG. 3C illustrates a second time period (time=2) in the edge environment 300. As shown in FIG. 3C, the sensor 316, has now moved close enough to the cluster 320 that it can be logically connected to the sensors of the cluster 320, thereby creating a new cluster 320A. In addition, the cluster 330 has moved close enough to the cluster 310 that the sensors 331 and 332 can be logically connected to the sensors of cluster 310, thereby creating a new cluster 310A. This again illustrates the dynamic nature of the edge environment 300 and that clusters can be merged together. However, even though there have been some changes in the cluster structures between the first time period (time=1) and the second time period (time=2), the cluster structures in the second time period (time=2) still roughly resemble the cluster structures in the first time period (time=2).

FIGS. 3A-3C illustrate some important aspects of the algorithm for leveraging edge environment structures. Firstly, referring to FIG. 3A, if the system has a limited ability to sample sensors, but wants a broad picture of the edge environment 300, then it would not make sense to only use sensor data or message data from only the sensors of cluster 310 as that is limited to only a portion of the environment. Rather, it would make sense to sample from sensors in several of the clusters to obtain better gain of information. For example, if the sampling was limited only to three sensors, then only sampling from sensors 311, 312, and 314 of cluster 310 would not yield much information about the edge environment because they are so close to each other. However, sampling sensors 316 of cluster 310, 325 of cluster 320, and sensor 331 of cluster 330 would yield a much higher gain of information for the same sampling cost. Thus, the algorithm for leveraging edge environment structures allows for determining which sensors to sample.

There may be times, however, when it is important to focus the sampling on a specific region of the edge environment. For example, if there is a need to focus on the area of the edge environment occupied by the cluster 310, then it may make sense to sample sensors 311, 312, and 314 of cluster 310. In such a case, the algorithm for leveraging edge environment structures allows for focusing as needed. This focusing is based on the tasks that the sensors are running in the environment. Thus, a task being performed by the sensors in the area of one cluster would lead to inter-cluster sampling the sensors of that cluster and a task being performed by sensors in more than one cluster would lead to intra-cluster sampling. Again, it would be based on tradeoff between the gain of information and the cost to obtain the information.

Further, there is a high computational cost to make the logical connections between the sensors in the cluster structures. Thus, the algorithm for leveraging edge environment structures spends a large amount of computational resources in the initial time period such as that shown in FIG. 3A to capture the initial cluster structures. In the next time periods, the algorithm takes advantage of Property 2 and only tracks the changes that have occurred. Thus, from time=0 in FIG. 3A to time=1 in FIG. 3B, the algorithm would only have to track the changes of sensor 316 since the rest of the structures are roughly the same. Thus, since each time sample occurs much faster than any changes of the cluster structures occur, only tracking the changes and assuming the rest of the structures are roughly the same greatly reduces the required computational resources needed.

The algorithm for leveraging edge environment structures as described in FIGS. 3A-3C will now be described in more detail as follows:

Stage 0. Capture Initial Structure (time=0, FIG. 3A).

This method relies on computationally intensive algorithms but only needs to be executed during initialization.

1. Build a 1-nearest-neighbor graph (1-NNG) within affected region and trace its structure in G.
   i. Instead of computing the directed graph in a metric space, the algorithm uses $-O(m_i, m_j)$ as the measure of distance between two points.
   ii. The algorithm then splits into clusters: If $O(m_i, m_j) < \varepsilon$, then attribute the edge between $m_i$ and $m_j$ as a cluster boundary.
   iii. A node $n_i$ in G has the minimal tuple form $n_i = (c_i, s_i, s', o')$, where $c_i$ is the corresponding cluster from node $n_i$, $m_i$ is the corresponding sensor message, s' are the nearest-neighbors and o' are their respective information overlap;

Stage 1. Keep Track of the Current Cluster Structures (time=1, FIG. 3B and time=2, FIG. 3C)

This stage takes advantage of Properties 1 and 2 to avoid computing the full structure at each time step. Therefore, it evaluates only potential perturbations on most sensitive nodes.

[Updating Intra-Cluster Information]

1. For each cluster $\mathcal{C}_h \in G$:
   i. Update—$O(m_i, m_j)$ "distances" for all $m_i, m_j \in \mathcal{C}_h$. It is noted that it is possible to save computations here, e.g., by exploiting symmetries, but other methods in math literature may also be employed. For simplicity of exposition, suppose that all $-O(m_i, m_j)$ distances are kept in a triangular matrix M.
   ii. Update the 1-NNG edges accordingly to the minimal distances;

iii. Scan for columns where $M_i > \varepsilon$ and mark its edge with smallest distance as a cluster boundary.

[Updating Inter-Cluster Information]

2. For each node $C_h \in G$:
   i. For each $e_l$ edge marked as a cluster $C_h$ boundary:
      Retrieve corresponding edge nodes $m_i$, $m_j$;
      Update $-O(m_i, m_j)$ "distance";
      Perform steepest descent traversing both $m_i$, $m_j$ neighbors while there are improvements in $-O(m_i, m_j)$ "distances";
      If $O(m_i, m_j) > \varepsilon$, then remove boundary attribute from edge $e_l$.
      Otherwise, check if boundary needs to be updated with other clusters. There are several ways to perform this computation. One potential approximation is to keep track of a 3-NNG using the cluster centroids and evaluate above steepest descent traversing the other neighboring cluster nodes. Whenever a neighboring cluster node is found to have smaller $-O(m_i, m_j')$ distance than the current edge $e_l$, the edge is updated to be between nodes $m_i$, $m_j'$.
      Likewise, above, remove boundary attribute from node if $-O(m_i, m_j')$ distance is too small.

Stage 2. Message Sampling (time=1, FIG. 3B and time=2, FIG. 3C)

This stage takes advantage of the concentration structure to break down the sampling problem into simpler ones.

1. Let $m^*(t) = \emptyset$, $\mathcal{M}'_t = \mathcal{M}_t$, and $C_k' = C_k$ be local variables;
2. For each message $m_i \in \mathcal{M}'_t$, compute the maximum expected mission-aware joint knowledge contribution $k_i$, i.e.

$$k_i = \hat{K}(t+1; A, \tau, \alpha, \mathcal{M}'_t = m_i);$$

3. Compute a knowledge-cost trade-off measure $g = f(k)$:
   i. It can simply ignore the cost and greedily focus on the knowledge gain regardless of the cost, i.e., $g_i = k_i$;
   ii. It can be some statistics of the ratio between $k_i$ and its resource cost $C(m_i, t; A)$, e.g., $g_i = k_i / \|C(m_i, t; A)\|$, or
   iii.

$$g_i = k_i / \max_j \frac{C(m_i, t; A)_j}{\overline{b(t)}_j},$$

where $\overline{b(t)}$ is the remaining budget considering the already selected messages;

4. Retrieve the best knowledge-cost trade-off contribution $g_{C_k}^{(max)}$ of each cluster $C_h'$ and arrange it in a vector $$g_c^{(max)} = \{g_{c1}^{(max)}, \ldots, g_{cn}^{(max)}\}$$

5. Sample messages:
   i. [Inter-Cluster Sampling]
   1. Select the best messages from each cluster while they comply to some criteria. Potential selection methods are, for instance, by using simulation to determine the optimal contribution fraction threshold. It is noted that this approach performs lazy intra-cluster knowledge overlap updates by prioritizing inter-cluster sampling whenever above rule predicts that.

2. Whenever a message is sampled, evaluate the resource condition:

$$\sum_{mj \in mi_i \cup m^*(t)} C(m_j, t; A) < b(t)$$

if not satisfied, stop the algorithm and return $m^*(t)$;
   3. Let the selected message with highest contribution $g_i$ be $m_i$, then append it to the selected messages $m^*(t) = m_i \cup m^*(t)$;
      a. Remove $m_i$ from $\mathcal{M}'_t$ and from its corresponding cluster copy $C_k'$;

ii. [Update Intra-Cluster Information]
   1. For each cluster $C_k'$ with a removed message, recompute the contributions by traversing cluster $C_k'$ using removed message $m_i$ as a starting point and performing $k_j -= O(m_i, m_j)$ while $O(m_i, m_j) > n \cdot \varepsilon$, where n are the remaining nodes in the traversing path. IT is noted that this approach allows to alleviate the approximation problem in the greedy algorithm discussed previously herein by balancing the contribution by the remaining potential paths impacting in the contribution. This is possible because of the availability of the cluster structure.

iii. [Update Inter-Cluster Information]
   1. The above traversing can continue traversing through other clusters by pathing through boundary edges, and only stop when condition $O(m_i, m_j) > n \cdot \varepsilon$ is met. This solves Problem 3.

iv. Repeat from step 3 until reaching resource condition.

The algorithm for leveraging edge environment structures has the following aspects:
Problem 1 is avoided by only computing $O(m_i, m_j)$ only to evaluate for local changes in the structure;
Problem 2 is mitigated by performing computations directly on $O(m_i, m_j)$ instead of a surrogate function.
Problem 3 is solved by leveraging on the structure knowledge, which allows to efficiently approximate impacts to $O(m_i, m_j)$ by proceeding traversing the graph whenever $O(m_i, m_j) > n \cdot \varepsilon$.

F. EXAMPLES

Figure 4:
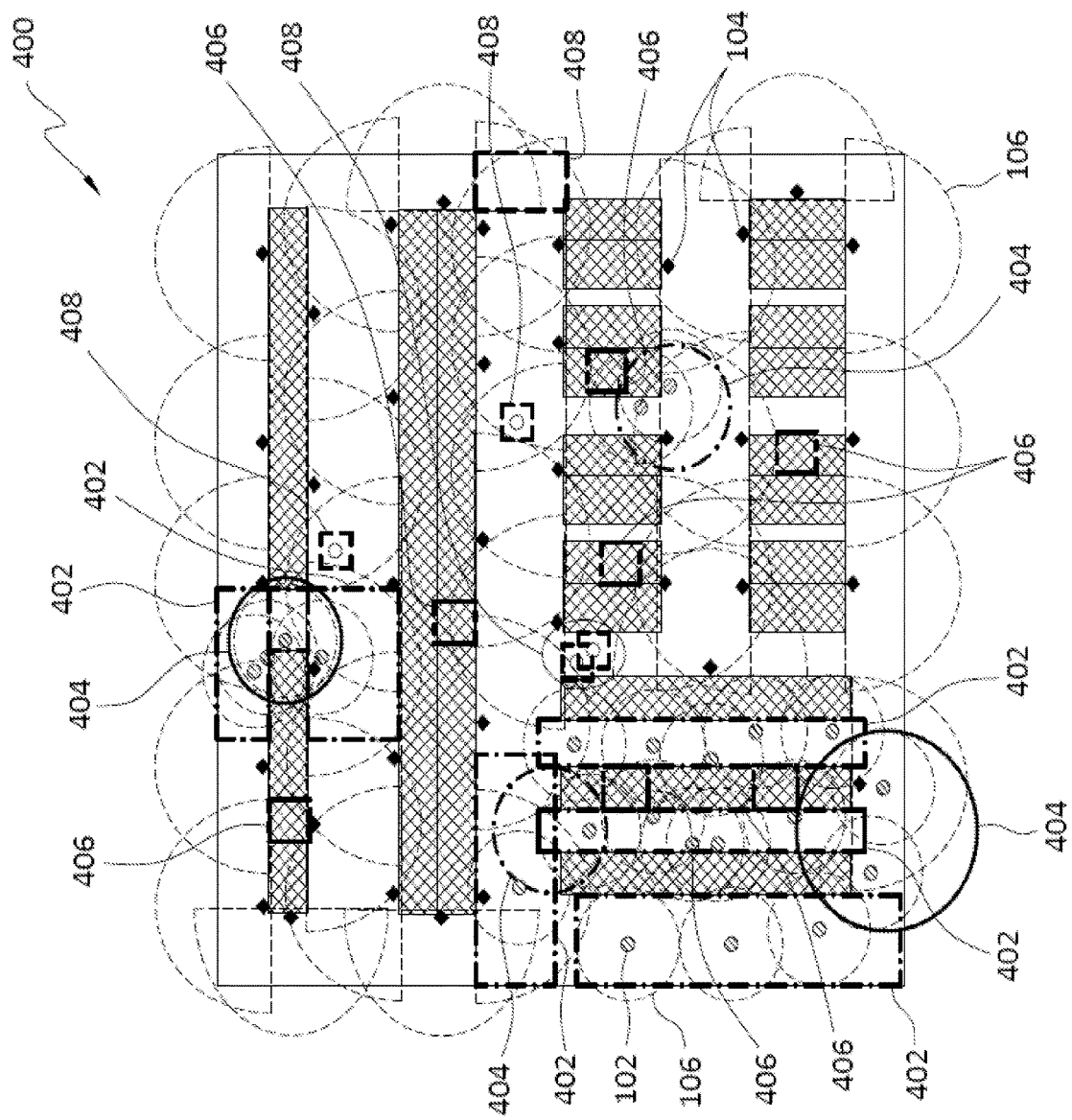
FIG. 4 discloses a configuration for an edge application, as disclosed in FIG. 1, according to one example embodiment of the invention.

With attention now to FIG. 4, which discloses one possible environment 400 for the edge application disclosed in FIG. 1 where the continuous lines depict mission-oriented attention mechanisms $\phi(p, t; \tau, \alpha)$ with a different font for each task and different line widths to represent the attention scale.

In particular, it is shown how, in one embodiment, a framework may be employed based on the scenario depicted in FIG. 4. In the application of FIG. 4, the following tasks are being considered:

1. Pathing 402, indicating the path(s) traveled in the domain by one or more agents—the near-edge node may prioritize retrieving information of crowded regions by setting $\phi$ as a function of the density of agents in a region;
2. Dangerous cornering events 404—whenever an agent is known to path through a corner, it is possible to assign a $\phi$ region to collect information and ensure that it is performed properly;
3. Inventory checking 406—as part of orchestration, it might be required to check whether some part of the inventory is as expected to identify the best unit to be assigned to some task—for example, there might be changes in the inventory exact position, requiring a more precise unit to perform the task—further, the near-edge may also be interested in checking inventory to ensure that the goods are as expected and were not modified due to some external interference—by assigning φ to retrieve information from only the part of the inventory that is of current interest, an embodiment may successfully accomplish this task with lower resource demands;

4. Security 408—it may be important to keep the near-edge node as omniscient as possible of what happens in the environment 400 even though an embodiment may not observe the full environment—whenever an external agent, for example not a connected human, joins the environment 400, it is possible to track the external agent by setting a φ region to follow its position—it may also be considered to add a permanent φ region around entrance/exits to immediately observe the presence of such agents, but also add φ regions on positions that decayed to very low information levels for a given amount of time.

G. Example Methods

Figure 5:
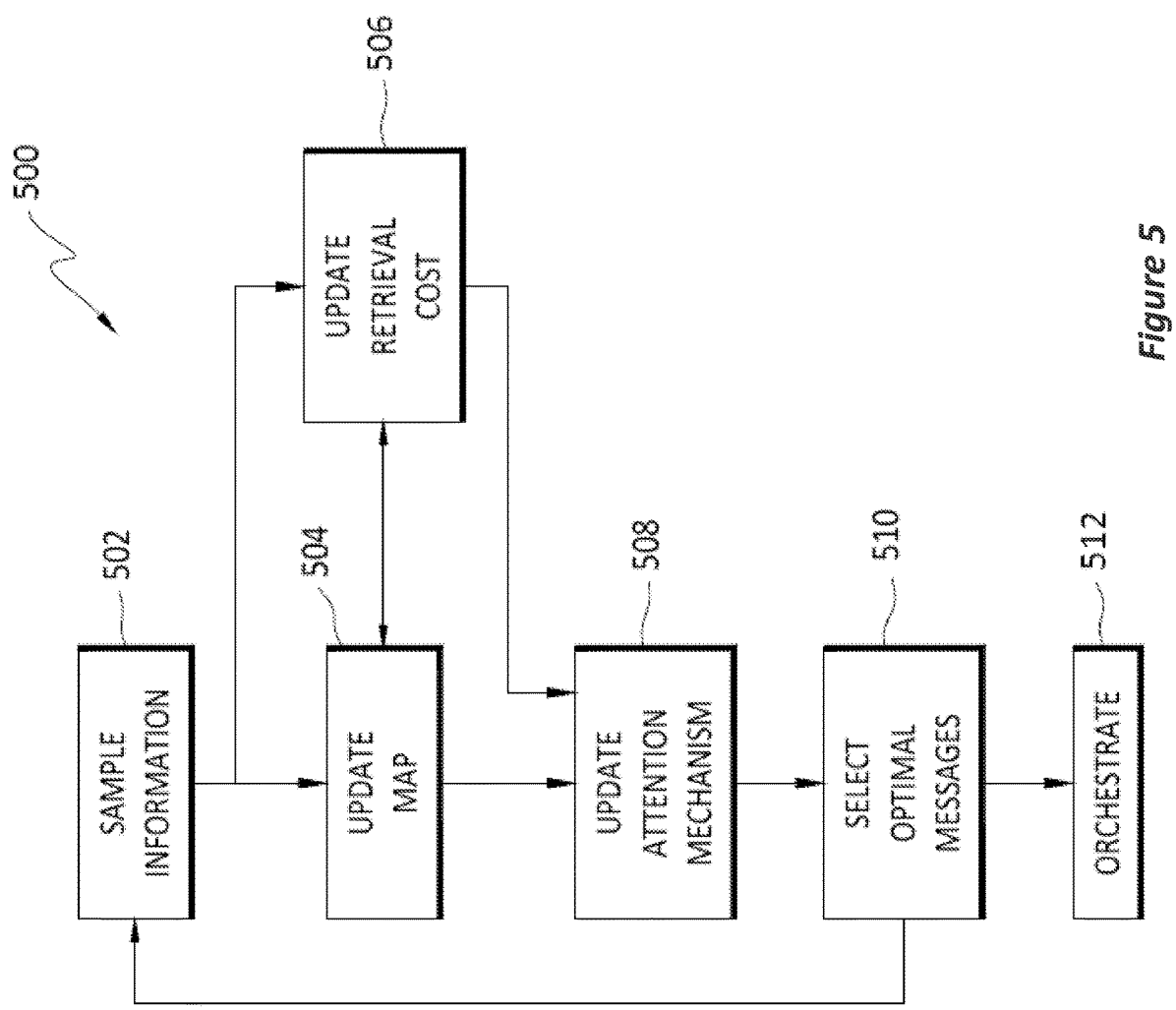
FIG. 5 discloses aspects of a method according to one example embodiment.

It is noted with respect to the disclosed methods, including the example method of FIG. 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, a method according to one example embodiment is referenced at 500. The method 500 may be performed iteratively so it should be understood that the operations disclosed in FIG. 5 may be performed any number of times. In an embodiment, part or all of the method 500 may be performed by, and/or at the direction of, a central node that communicates with a group of far-edge nodes such as sensors, for example. However, the scope of the invention is not limited to any particular environment, nor to any particular elements of an environment.

The example method 500 may begin with the sampling 502 of information from one or more edge nodes of an environment, such as a far-edge physical environment. The edge nodes are grouped into cluster structures. The environment may comprise a domain, such as a logistics warehouse for example. In an embodiment, the information may comprise one or more messages sent to/from the sampled nodes. A message may comprise, for example, information generated and/or gathered by a sensor.

The information obtained at 502 may then be used for various operations. For example, the information may be used to update 504 a map of the environment. The map may indicate a state of the environment at a particular time [t]. The state may identify, for example, what tasks are being performed in the environment, and which entities, such as far-edge devices, are performing those tasks. The state may also indicate processing, and/or other, capabilities of the devices in the environment, and an extent to which those capabilities are being utilized.

The information obtained at 502 may also be used to update 506 a retrieval cost, that is an estimated cost associated with retrieving and parsing information of a given message. A retrieval cost may be expressed in terms of the resources, such as bandwidth, computing, or storage, that would be expected to be consumed when retrieving and parsing a message. In an embodiment, the retrieval cost may be updated 506 based at least in part on the updates 504 that were made to the map.

The updated 504 map and the updated 506 retrieval cost information may then be used to update 508 an attention mechanism that operates to control retrieval of information from the region(s) of the environment that are expected to produce the most relevant information as to the state of the environment. Note that a balance may be struck between, on the one hand, updating the most outdated state(s) in the environment that are relevant to a group of tasks to be performed, or being performed, and, on the other hand, maximizing the total area of coverage of the information sampled from the nodes. Further, information retrieval may require use of far-edge resources, such as memory and bandwidth for example, that could otherwise be used for task execution by the far-edge devices, and as such, and noted earlier, the cost, in terms of resource consumption, of information retrieval may factor into decisions as to what information to retrieve, when, and from what source(s).

After the attention mechanism has been updated 508, the attention mechanism may then identify and select 510 the optimal message(s) for retrieval. Because the identified 510 messages indicate the state of the environment, the messages may be used as a basis for orchestration 512 of the placement and execution of tasks within the environment.

H. Further Example Embodiments

Following are some further example embodiments of the invention. These are presented only by way of example and are not intended to limit the scope of the invention in any way.

Embodiment 1. A method, comprising: performing, in a global environment that includes a central node and edge nodes that are able to communicate with each other, by the central node, operations comprising: sampling optimal information from the edge nodes concerning a state of the global environment, the edge nodes being grouped into a plurality of cluster structures; based on the optimal information, updating a global map of the global environment; based on the optimal information, updating an information retrieval cost; using the state of the global environment to orchestrate placement and execution of one or more tasks and actions in the global environment; using the updated global map, information retrieval cost, tasks and actions to update an attention mechanism operable to control retrieval of next optimal information; selecting next optimal information for retrieval.

Embodiment 2. The method as recited in any preceding embodiment, wherein the optimal information comprises one or more messages generated by two or more edge nodes included in a same cluster structure in the global environment from which the optimal information was retrieved.

Embodiment 3. The method as recited in any preceding embodiment, wherein the two or more edge nodes included in the same cluster structure are performing the same one or more tasks and actions in the global environment.

Embodiment 4. The method as recited in any preceding embodiment, wherein the optimal information comprises one or more messages generated by two or more edge nodes included in different cluster structures in the global environment from which the optimal information was retrieved.

Embodiment 5. The method as recited in any preceding embodiment, wherein the two or more edge nodes included in the different cluster structures are performing the same one or more tasks and actions in the global environment.

Embodiment 6. The method as recited in any preceding embodiment, wherein the plurality of cluster structures include two or more edge nodes that are located in close proximity to each other in the global environment.

Embodiment 7. The method as recited in any preceding embodiment, further comprising: generating the plurality of cluster structures during an initial time period; and tracking only changes made to one or more of the plurality of cluster structures during one or more subsequent time periods.

Embodiment 8. The method as recited in any preceding embodiment, wherein the changes made to one or more of the plurality of cluster structures comprise one or more of: merging two cluster structures to generate a new cluster structure; moving one cluster from a first location in the global environment to a second location in the global environment; or having one or more edge nodes move from a first cluster structure to a second cluster structure.

Embodiment 9. The method as recited in any preceding embodiment, wherein the edge nodes comprise respective agents operable to interact with the global environment.

Embodiment 10. The method as recited in any preceding embodiment, wherein the edge nodes comprise a combination of static sensors and mobile sensors.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform anyone or more of the methods disclosed herein, or any part(s) of any method disclosed. As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
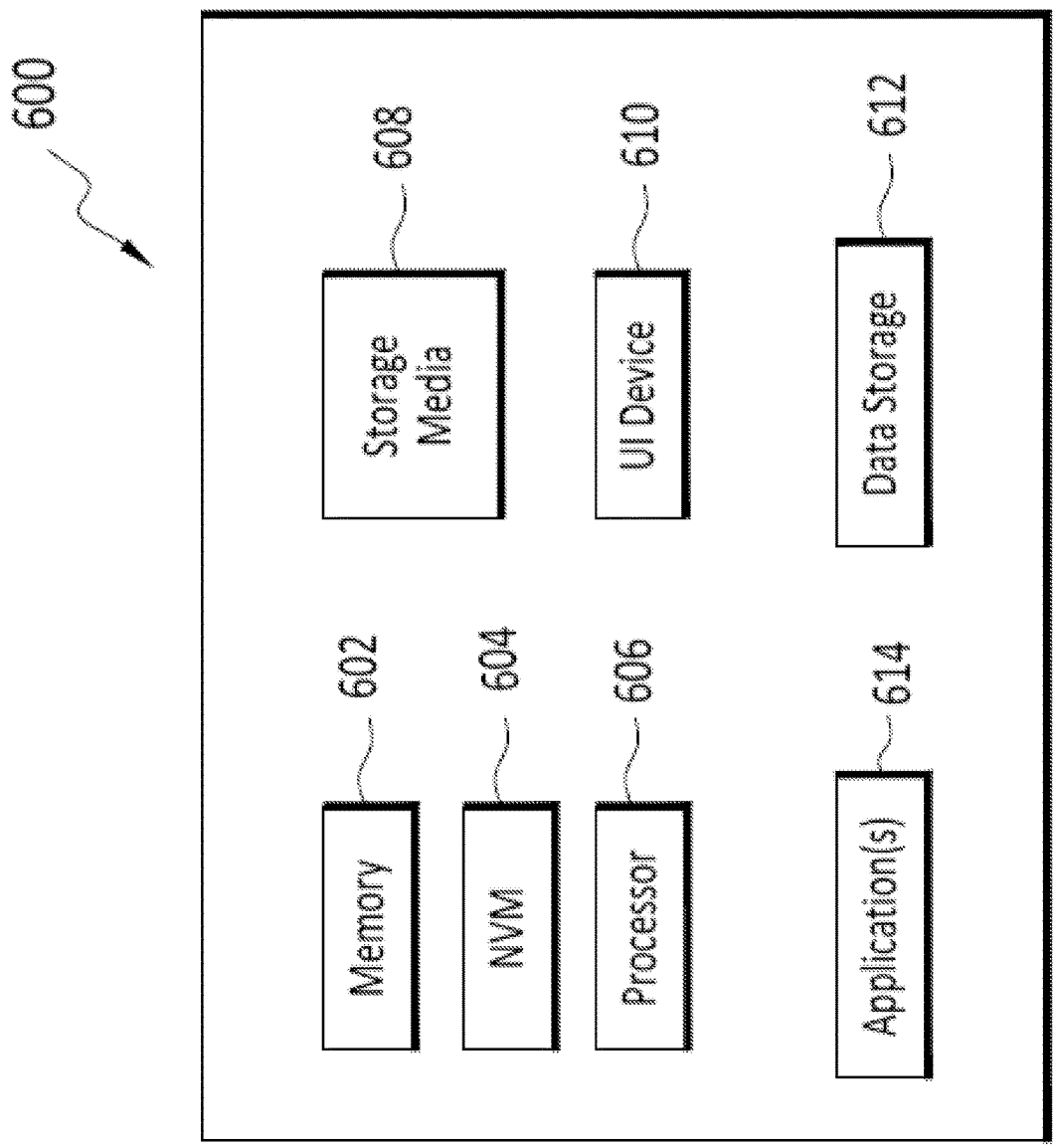
FIG. 6 discloses aspects of a computing entity operable to perform any of the disclosed methods, processes, and operations.

With reference briefly now to FIG. 6, any one or more of the entities disclosed, or implied, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   performing, in a global environment that includes a central node and edge nodes that are able to communicate with each other, by the central node, operations comprising:
   generating a plurality of cluster structures into which edge nodes are grouped during an initial time period;
   sampling optimal information from the edge nodes concerning a state of the global environment, the edge nodes being grouped into the plurality of cluster structures;
   based on the optimal information, updating a global map of the global environment;
   based on the optimal information, updating an information retrieval cost;
   using the state of the global environment to orchestrate placement and execution of one or more tasks and actions in the global environment;
   using the updated global map, information retrieval cost, tasks and actions to update an attention mechanism operable to control retrieval of next optimal information;
   selecting next optimal information for retrieval; and
   tracking only changes made to one or more of the plurality of cluster structures during one or more subsequent timer periods, wherein the changes made to one or more of the plurality of cluster structures comprise:
   merging two cluster structures to generate a new cluster structure;
   moving one cluster from a first location in the global environment to a second location in the global environment; and
   having one or more edge nodes move from a first cluster structure to a second cluster structure.

2. The method as recited in claim 1, wherein the optimal information comprises one or more messages generated by two or more edge nodes included in a same cluster structure in the global environment from which the optimal information was retrieved.

3. The method of claim 2, wherein the two or more edge nodes included in the same cluster structure are performing a same one or more tasks and actions in the global environment.

4. The method as recited in claim 1, wherein the optimal information comprises one or more messages generated by two or more edge nodes included in different cluster structures in the global environment from which the optimal information was retrieved.

5. The method of claim 4, wherein the two or more edge nodes included in the different cluster structures are performing a same one or more tasks and actions in the global environment.

6. The method of claim 1, wherein the plurality of cluster structures include two or more edge nodes that are located in close proximity to each other in the global environment.

7. The method as recited in claim 1, wherein the edge nodes comprise respective agents operable to interact with the global environment.

8. The method as recited in claim 1, wherein the edge nodes comprise a combination of static sensors and mobile sensors.

9. A non-transitory storage medium having stored therein instructions that are executable by one or more hardware processors to:
   perform, in a global environment that includes a central node and edge nodes that are able to communicate with each other, by the central node, operations comprising:
   generating a plurality of cluster structures into which edge nodes are grouped during an initial time period;
   sampling optimal information from the edge nodes concerning a state of the global environment, the edge nodes being grouped into the plurality of cluster structures;
   based on the optimal information, updating a global map of the global environment;
   based on the optimal information, updating an information retrieval cost;
   using the state of the global environment to orchestrate placement and execution of one or more tasks and actions in the global environment;
   using the updated global map, information retrieval cost, tasks and actions to update an attention mechanism operable to control retrieval of next optimal information; and
   selecting next optimal information for retrieval; and
   tracking only changes made to one or more of the plurality of cluster structures during one or more subsequent timer periods, wherein the changes made to one or more of the plurality of cluster structures comprise:
   merging two cluster structures to generate a new cluster structure:
   moving one cluster from a first location in the global environment to a second location in the global environment; and
   having one or more edge nodes move from a first cluster structure to a second cluster structure.

10. The non-transitory storage medium as recited in claim 9, wherein the optimal information comprises one or more messages generated by two or more edge nodes included in a same cluster structure in the global environment from which the optimal information was retrieved.

11. The non-transitory storage medium as recited in claim 10, wherein the two or more edge nodes included in the same cluster structure are performing a same one or more tasks and actions in the global environment.

12. The non-transitory storage medium as recited in claim 9, wherein the optimal information comprises one or more messages generated by two or more edge nodes included in different cluster structures in the global environment from which the optimal information was retrieved.

13. The non-transitory storage medium as recited in claim 12, wherein the two or more edge nodes included in the different cluster structures are performing a same one or more tasks and actions in the global environment.

14. The non-transitory storage medium as recited in claim 9, wherein the plurality of cluster structures include two or more edge nodes that are located in close proximity to each other in the global environment.

15. The non-transitory storage medium as recited in claim 9, wherein the edge nodes comprise respective agents operable to interact with the global environment.

16. The non-transitory storage medium as recited in claim 9, wherein the edge nodes comprise a combination of static sensors and mobile sensors.

\* \* \* \* \*